United States Patent
Pulukkody et al.

(10) Patent No.: US 11,441,002 B2
(45) Date of Patent: Sep. 13, 2022

(54) FREE STANDING DISPERSANT FILM

(71) Applicant: Rohm and Haas Company, Collegeville, PA (US)

(72) Inventors: Randara Pulukkody, Landsdale, PA (US); Scott Backer, Phoenixville, PA (US); Afua Sarpong Karikari, Bristol, PA (US); Michael C. Mitchell, King Prussia, PA (US)

(73) Assignee: Rohm and Haas Company, Collegeville, PA (US)

( * ) Notice: Subject to any disclaimer, the term of this patent is extended or adjusted under 35 U.S.C. 154(b) by 323 days.

(21) Appl. No.: 16/606,292

(22) PCT Filed: May 10, 2018

(86) PCT No.: PCT/US2018/031982
§ 371 (c)(1),
(2) Date: Oct. 18, 2019

(87) PCT Pub. No.: WO2018/222364
PCT Pub. Date: Dec. 6, 2018

(65) Prior Publication Data
US 2021/0102033 A1   Apr. 8, 2021

Related U.S. Application Data

(60) Provisional application No. 62/512,762, filed on May 31, 2017.

(51) Int. Cl.
   *C11D 17/04* (2006.01)
   *C11D 3/37* (2006.01)
   *C08J 5/18* (2006.01)

(52) U.S. Cl.
   CPC ............ *C08J 5/18* (2013.01); *C11D 17/042* (2013.01); *C08J 2329/04* (2013.01); *C08J 2471/02* (2013.01)

(58) Field of Classification Search
   None
   See application file for complete search history.

(56) References Cited

U.S. PATENT DOCUMENTS

| 4,115,292 | A | 9/1978 | Richardson et al. |
| 4,481,326 | A | 11/1984 | Sonenstein |
| 4,692,494 | A | 9/1987 | Sonenstein |
| 4,972,017 | A | 11/1990 | Smith et al. |
| 6,787,512 | B1 | 9/2004 | Verrall et al. |
| 10,982,175 | B2 * | 4/2021 | Karikari ............... C11D 3/3753 |
| 2009/0312218 | A1 * | 12/2009 | Barthel ................ C11D 17/045 510/221 |
| 2011/0186467 | A1 * | 8/2011 | Denome ............. C11D 17/045 206/524.7 |
| 2012/0302489 | A1 | 11/2012 | Rodrigues et al. |
| 2013/0273277 | A1 | 10/2013 | Lee et al. |
| 2016/0024446 | A1 | 1/2016 | Lee et al. |
| 2016/0326325 | A1 | 11/2016 | Lee et al. |
| 2020/0010783 | A1 * | 1/2020 | Karikari .................... C08J 5/18 |
| 2020/0062913 | A1 * | 2/2020 | Gulyas ..................... C08J 7/065 |

FOREIGN PATENT DOCUMENTS

| GB | 2104091 A | 3/1983 |
| WO | 2001085892 A1 | 11/2001 |
| WO | 2016061069 A2 | 4/2016 |

* cited by examiner

*Primary Examiner* — Lorna M Douyon
(74) *Attorney, Agent, or Firm* — Thomas S. Deibert

(57) ABSTRACT

A free standing dispersant film is provided, including: a partially hydrolyzed polyvinyl acetate; a poly(ethylene oxide); a polyalkylene glycol; a plasticizer; a dispersant polymer; optionally, a poly(isobutylene-co-maleic anhydride) copolymer, wherein the poly(isobutylene-co-maleic anhydride) copolymer is at least partially neutralized; and optionally, an optional additive.

9 Claims, No Drawings

FREE STANDING DISPERSANT FILM

The present invention relates to a free standing dispersant film. In particular, the present invention relates to a formulation for the free standing dispersant film and to a unit dose package made with the free standing dispersant film.

Conventional water-soluble polymeric films have found use as packaging materials that facilitate the simplification of dispersing, pouring, dissolving and dosing of materials to be delivered. For example, packages prepared from conventional water-soluble films are commonly used to contain a premeasured unit dose of a household care composition, such as, a dish or laundry detergent formulation. The consumer may then directly add the household care compositions containing package to a mixing vessel for use. This approach advantageously allows for the accurate dosing of the household care composition while eliminating the need for the consumer to have to measure out the composition. This approach also advantageously may reduce mess that might otherwise be associated with consumer dispensing of the composition.

Many conventional water-soluble films fail to adequately dissolve during use, e.g., during a laundry wash cycle, resulting in an undesirable film residue being deposited on the laundry. This concern may be exacerbated when the conditions of use introduce stressed wash conditions, such as when the package is used in cold water. Given the desire to reduce energy costs, consumers are increasingly in need of unit dosage systems that will perform reliably in cold water conditions.

Many conventional water-soluble films that do completely dissolve during use, e.g., during a laundry wash cycle, using cold water unfortunately exhibit an undesirable degree of sensitivity to moisture and humidity. That is, these films when incorporated into unit dose pouches exhibit insufficient storage stability, particularly when the contained detergent includes higher water concentrations. These films also display handling concerns when incorporated into unit does pouches (e.g., handling of the pouches with wet hands may result in the packages adhering to one another or leakage of their contents).

Conventional unit dose packages produced with films comprising polyvinyl alcohol polymers have addressed the some of the aforementioned issues with limited success. However, the cold water solubility of some polyvinyl alcohol films may decrease when contacted with certain detergent compositions. Consequently, as these unit dose packages age, the films may fail to adequately dissolve during a cold wash cycle, and may in turn leave undesirable film residue on items within the wash.

Conventional unit dose packages made from water-soluble films comprising polymers other than polyvinyl alcohol polymers may fail to adequately address the aforementioned concerns. For example, a polymeric film comprising starch and/or cellulosic materials may provide suitable water-drop resistance. However, to facilitate desirable cold water solubility such films may need to be made so thin that the resulting mechanical properties are compromised. Moreover, films comprising starch and/or cellulosic materials are more challenging to process given their mechanical properties as compared to films of like thickness comprising polyvinyl alcohol polymers.

Conventional film formulations fail to perform adequately. Thus, there remains a need for packets comprising water-soluble films having a desirable balance of performance and mechanical properties; particularly wherein the films also exhibit functionality.

There remains a need for water soluble films and unit dose packages produced therewith having the desired performance characteristics and mechanical properties along with the incorporation of desirable end use functionality (e.g., scale preventive properties).

The present invention provides a free standing dispersant film, comprising: 19 to 85 wt % of a partially hydrolyzed polyvinyl acetate; 5 to 70 wt % of a poly(ethylene oxide); 1 to 35 wt % of a polyalkylene glycol; 0.5 to 25 wt % of a plasticizer; 2 to 50 wt % of a dispersant polymer; 0 to 10 wt % of a poly(isobutylene-co-maleic anhydride) copolymer, wherein the poly(isobutylene-co-maleic anhydride) copolymer is at least partially neutralized; and 0 to 10 wt % of an optional additive.

The present invention provides a free standing dispersant film, comprising: 19 to 85 wt % of a partially hydrolyzed polyvinyl acetate; 5 to 70 wt % of a poly(ethylene oxide); 1 to 35 wt % of a polyalkylene glycol; 0.5 to 25 wt % of a plasticizer; 2 to 50 wt % of a dispersant polymer, wherein the dispersant polymer is an amphoteric dispersant polymer, comprising a copolymer of an anionic vinyl monomer and a cationic vinyl monomer, wherein the cationic vinyl monomer contains at least one tertiary amine nitrogen atom; 0 to 10 wt % of a poly(isobutylene-co-maleic anhydride) copolymer, wherein the poly(isobutylene-co-maleic anhydride) copolymer is at least partially neutralized; and 0 to 10 wt % of an optional additive; wherein the dispersant polymer does not contain quaternary amine functionality.

The present invention provides a unit dose package, comprising: a free standing dispersant film of the present invention; and a detergent formulation, comprising: 14 to 60 wt % of a surfactant; 3 to 25 wt % of a salt; and 20 to 75 wt % of a water; wherein the free standing dispersant film forms a cavity; wherein the detergent formulation is disposed within the cavity; and wherein the detergent formulation is in contact with the free standing dispersant film.

DETAILED DESCRIPTION

We have found a unique water soluble film formulation that have good cold water solubility, desirable mechanical properties and the incorporation of anti-scale functionality.

Unless otherwise indicated, ratios, percentages, parts, and the like are by weight.

As used herein, unless otherwise indicated, the phrase "molecular weight" refers to the weight average molecular weight, Mw, as measured in a conventional manner with gel permeation chromatography (GPC) and polyacrylic acid standards. GPC techniques are discussed in detail in Modem Size Exclusion Chromatography, W. W. Yau, J. J. Kirkland, D. D. Bly; Wiley-Interscience, 1979, and in A Guide to Materials Characterization and Chemical Analysis, J. P. Sibilia; VCH, 1988, p. 81-84. Molecular weights are reported herein in units of Daltons.

The term "polymer" as used herein and in the appended claims refers to a compound prepared by polymerizing monomers, whether of the same or a different type. The generic term "polymer" includes the terms "homopolymer," "copolymer," and "terpolymer."

The term "water soluble" as used herein in reference to a free standing dispersant film of the present invention means that a sample of the free standing dispersant film (0.5"× 1.5"×76 µm) when placed in 20 mL of tap water having a temperature of 5 to 25° C. in a sample vial; left to sit undisturbed for two (2) minutes; then shaken for sixty (60) seconds and then filtered through a 0.025 mm mesh screen, wherein only a slight haze is perceptible and no residue or grit is observed according to the procedure set forth herein in the Examples. Preferably, the free standing dispersant films of the present invention are also water soluble based on film solubility tests conducted according to MSTM (Mono-Sol Standard Test Method) 205 in distilled water at 25° C.

The term "polymerized units derived from" as used herein and in the appended claims refers to polymer molecules that are synthesized according to polymerization techniques wherein a product polymer contains "polymerized units derived from" the constituent monomers which are the starting materials for the polymerization reactions. As used herein, the term "(meth)acrylate" refers to either acrylate or methacrylate, and the term "(meth)acrylic" refers to either acrylic or methacrylic. As used herein, the term "substituted" refers to having at least one attached chemical group, for example, alkyl group, alkenyl group, vinyl group, hydroxyl group, carboxylic acid group, other functional groups, and combinations thereof.

The term "homogeneous" as used herein and in the appended claims in reference to the free standing dispersant film means that upon visual examination with the unaided human eye, the free standing dispersant film has a single phase throughout.

Preferably, the free standing dispersant film of the present invention, comprises: 19 to 85 wt % (preferably, 20 to 80 wt %; more preferably, 25 to 75 wt %; most preferably, 45 to 70 wt %) of a partially hydrolyzed (preferably, 80 to 98% hydrolyzed) polyvinyl acetate; 5 to 70 wt % (preferably, 6 to 50 wt %; more preferably, 7.5 to 25 wt %; most preferably, 10 to 15 wt %) of a poly(ethylene oxide); 1 to 35 wt % (preferably, 2 to 35 wt %; more preferably, 2.5 to 10 wt %; most preferably, 3 to 5 wt %) of a polyalkylene glycol; 0.5 to 25 wt % (preferably 5 to 25 wt %; more preferably, 7.5 to 20 wt %; most preferably, 10 to 20 wt %) of a plasticizer; 2 to 50 wt % (2.25 to 25 wt %; more preferably, 2.5 to 20 wt %; most preferably, 3 to 6 wt %) of a dispersant polymer; 0 to 10 wt % (preferably, 1 to 7.5 wt %; more preferably, 3 to 6 wt %; most preferably, 4 to 5.5 wt %) of a poly (isobutylene-co-maleic anhydride) copolymer, wherein the poly(isobutylene-co-maleic anhydride) copolymer is at least partially neutralized; and 0 to 10 wt % of an optional additive.

Preferably, the partially hydrolyzed polyvinyl acetate used in the free standing dispersant film of the present invention is 80 to 98% hydrolyzed. More preferably, the partially hydrolyzed polyvinyl acetate used in the free standing dispersant film of the present invention is 84 to 95% hydrolyzed. Still more preferably, the partially hydrolyzed polyvinyl acetate used in the free standing dispersant film of the present invention is 86 to 92% hydrolyzed. Most preferably, the partially hydrolyzed polyvinyl acetate used in the free standing dispersant film of the present invention is 87 to 90% hydrolyzed.

Preferably, the partially (preferably, 80 to 98%; more preferably, 84 to 95%; still more preferably, 86 to 92%; most preferably, 87 to 90%) hydrolyzed polyvinyl acetate used in the free standing dispersant film of the present invention has a weight average molecular weight of 10,000 to 250,000 Daltons. More preferably, the partially (preferably, 80 to 98%; more preferably, 84 to 95%; still more preferably, 86 to 92%; most preferably, 87 to 90%) hydrolyzed polyvinyl acetate used in the free standing dispersant film of the present invention has a weight average molecular weight of 20,000 to 200,000 Daltons. Still more preferably, the partially (preferably, 80 to 98%; more preferably, 84 to 95%; still more preferably, 86 to 92%; most preferably, 87 to 90%) hydrolyzed polyvinyl acetate used in the free standing dispersant film of the present invention has a weight average molecular weight of 40,000 to 175,000 Daltons. Most preferably, the partially (preferably, 80 to 98%; more preferably, 84 to 95%; still more preferably, 86 to 92%; most preferably, 87 to 90%) hydrolyzed polyvinyl acetate used in the free standing dispersant film of the present invention has a weight average molecular weight of 130,000 to 160,000 Daltons.

Preferably, the free standing dispersant film of the present invention, comprises 19 to 85 wt % of the partially (preferably, 80 to 98%; more preferably, 84 to 95%; still more preferably, 86 to 92%; most preferably, 87 to 90%) hydrolyzed polyvinyl acetate based on weight of the free standing dispersant film. More preferably, the free standing dispersant film of the present invention, comprises 20 to 80 wt % of the partially (preferably, 80 to 98%; more preferably, 84 to 95%; still more preferably, 86 to 92%; most preferably, 87 to 90%) hydrolyzed polyvinyl acetate based on weight of the free standing dispersant film. Still more preferably, the free standing dispersant film of the present invention, comprises 25 to 75 wt % of the partially (preferably, 80 to 98%; more preferably, 84 to 95%; still more preferably, 86 to 92%; most preferably, 87 to 90%) hydrolyzed polyvinyl acetate based on weight of the free standing dispersant film. Most preferably, the free standing dispersant film of the present invention, comprises 45 to 70 wt % of the partially (preferably, 80 to 98%; more preferably, 84 to 95%; still more preferably, 86 to 92%; most preferably, 87 to 90%) hydrolyzed polyvinyl acetate based on weight of the free standing dispersant film.

Preferably, the free standing dispersant film of the present invention, comprises 19 to 85 wt % of the partially (preferably, 80 to 98%; more preferably, 84 to 95%; still more preferably, 86 to 92%; most preferably, 87 to 90%) hydrolyzed polyvinyl acetate based on weight of the free standing dispersant film, wherein the partially (preferably, 80 to 98%; more preferably, 84 to 95%; still more preferably, 86 to 92%; most preferably, 87 to 90%) hydrolyzed polyvinyl acetate has a weight average molecular weight of 10,000 to 250,000 (preferably, 20,000 to 200,000; more preferably, 40,000 to 175,000; most preferably, 130,000 to 160,000) Daltons. More preferably, the free standing dispersant film of the present invention, comprises 20 to 80 wt % of the partially (preferably, 80 to 98%; more preferably, 84 to 95%; still more preferably, 86 to 92%; most preferably, 87 to 90%) hydrolyzed polyvinyl acetate based on weight of the free standing dispersant film, wherein the partially (preferably, 80 to 98%; more preferably, 84 to 95%; still more preferably, 86 to 92%; most preferably, 87 to 90%) hydrolyzed polyvinyl acetate has a weight average molecular weight of 10,000 to 250,000 (preferably, 20,000 to 200,000; more preferably, 40,000 to 175,000; most preferably, 130,000 to 160,000) Daltons. Still more preferably, the free standing dispersant film of the present invention, comprises 25 to 75 wt % of the partially (preferably, 80 to 98%; more preferably, 84 to 95%; still more preferably, 86 to 92%; most preferably, 87 to 90%) hydrolyzed polyvinyl acetate based on weight of the free standing dispersant film, wherein the partially (preferably, 80 to 98%; more preferably, 84 to 95%; still more preferably, 86 to 92%; most preferably, 87 to 90%) hydrolyzed polyvinyl acetate has a weight average molecular weight of 10,000 to 250,000 (preferably, 20,000 to 200,000; more preferably, 40,000 to 175,000; most preferably, 130,000 to 160,000) Daltons. Most preferably, the free standing dispersant film of the present invention, comprises 45 to 70 wt % of the partially (preferably, 80 to 98%; more preferably, 84 to 95%; still more preferably, 86 to 92%; most preferably, 87 to 90%) hydrolyzed polyvinyl acetate based on weight of the free standing dispersant film, wherein the partially (preferably, 80 to 98%; more preferably, 84 to 95%; still more preferably, 86 to 92%; most preferably, 87 to 90%) hydrolyzed polyvinyl acetate has a weight average molecular weight of 10,000 to 250,000 (preferably, 20,000 to 200,000; more preferably, 40,000 to 175,000; most preferably, 130,000 to 160,000) Daltons.

Preferably, the poly(ethylene oxide) used in the free standing dispersant film of the present invention has a weight average molecular weight of 20,000 to 2,000,000 Daltons. More preferably, the poly(ethylene oxide) used in the free standing dispersant film of the present invention has a weight average molecular weight of 100,000 to 1,000,000 Daltons. Still more preferably, the poly(ethylene oxide) used in the free standing dispersant film of the present invention has a weight average molecular weight of 250,000 to 750,000 Daltons. Most preferably, the poly(ethylene oxide) used in the free standing dispersant film of the present invention has a weight average molecular weight of 350,000 to 650,000 Daltons.

Preferably, the free standing dispersant film of the present invention, comprises 5 to 70 wt % of the poly(ethylene oxide), based on weight of the free standing dispersant film. More preferably, the free standing dispersant film of the present invention, comprises 6 to 50 wt % of the poly(ethylene oxide), based on weight of the free standing dispersant film. Still more preferably, the free standing dispersant film of the present invention, comprises 7.5 to 25 wt % of the poly(ethylene oxide), based on weight of the free standing dispersant film. Most preferably, the free standing dispersant film of the present invention, comprises 10 to 15 wt % of the poly(ethylene oxide), based on weight of the free standing dispersant film.

Preferably, the free standing dispersant film of the present invention, comprises 5 to 70 wt % of the poly(ethylene oxide), based on weight of the free standing dispersant film, wherein the poly(ethylene oxide) used has a weight average molecular weight of 20,000 to 2,000,000 (preferably, 100,000 to 1,000,000; more preferably, 250,000 to 750,000; most preferably, 350,000 to 650,000) Daltons. More preferably, the free standing dispersant film of the present invention, comprises 6 to 50 wt % of the poly(ethylene oxide), based on weight of the free standing dispersant film, wherein the poly(ethylene oxide) used has a weight average molecular weight of 20,000 to 2,000,000 (preferably, 100,000 to 1,000,000; more preferably, 250,000 to 750,000; most preferably, 350,000 to 650,000) Daltons. Still more preferably, the free standing dispersant film of the present invention, comprises 7.5 to 25 wt % of the poly(ethylene oxide), based on weight of the free standing dispersant film, wherein the poly(ethylene oxide) used has a weight average molecular weight of 20,000 to 2,000,000 (preferably, 100,000 to 1,000,000; more preferably, 250,000 to 750,000; most preferably, 350,000 to 650,000) Daltons. Most preferably, the free standing dispersant film of the present invention, comprises 10 to 15 wt % of the poly(ethylene oxide), based on weight of the free standing dispersant film, wherein the poly(ethylene oxide) used has a weight average molecular weight of 20,000 to 2,000,000 (preferably, 100,000 to 1,000,000; more preferably, 250,000 to 750,000; most preferably, 350,000 to 650,000) Daltons.

Preferably, the polyalkylene glycol used in the free standing dispersant film of the present invention has a number average molecular weight, $M_N$, of 250 to 5,300 Daltons. More preferably, the polyalkylene glycol used in the free standing dispersant film of the present invention has a number average molecular weight, $M_N$, of 500 to 1,500 Daltons. Still more preferably, the polyalkylene glycol used in the free standing dispersant film of the present invention has a number average molecular weight, $M_N$, of 750 to 1,200 Daltons. Most preferably, the polyalkylene glycol used in the free standing dispersant film of the present invention has a number average molecular weight, $M_N$, of 800 to 1,000 Daltons.

Preferably, the free standing dispersant film of the present invention, comprises 1 to 35 wt % of the polyalkylene glycol, based on weight of the free standing dispersant film. More preferably, the free standing dispersant film of the present invention, comprises 2 to 35 wt % of the polyalkylene glycol, based on weight of the free standing dispersant film. Still more preferably, the free standing dispersant film of the present invention, comprises 2.5 to 10 wt % of the polyalkylene glycol, based on weight of the free standing dispersant film. Most preferably, the free standing dispersant film of the present invention, comprises 2 to 5 wt % of the polyalkylene glycol, based on weight of the free standing dispersant film.

Preferably, the free standing dispersant film of the present invention, comprises 1 to 35 wt % of the polyalkylene glycol, based on weight of the free standing dispersant film, wherein the polyalkylene glycol used has a number average molecular weight, $M_N$, of 250 to 5,300 (preferably, 500 to 1,500; more preferably, 750 to 1,200; most preferably, 800 to 1,000) Daltons. More preferably, the free standing dispersant film of the present invention, comprises 2 to 35 wt % of the polyalkylene glycol, based on weight of the free standing dispersant film, wherein the polyalkylene glycol used has a number average molecular weight, $M_N$, of 250 to 5,300 (preferably, 500 to 1,500; more preferably, 750 to 1,200; most preferably, 800 to 1,000) Daltons. Still more preferably, the free standing dispersant film of the present invention, comprises 2.5 to 10 wt % of the polyalkylene glycol, based on weight of the free standing dispersant film, wherein the polyalkylene glycol used has a number average molecular weight, $M_N$, of 250 to 5,300 (preferably, 500 to 1,500; more preferably, 750 to 1,200; most preferably, 800 to 1,000) Daltons. Most preferably, the free standing dispersant film of the present invention, comprises 3 to 5 wt % of the polyalkylene glycol, based on weight of the free standing dispersant film, wherein the polyalkylene glycol used has a number average molecular weight, $M_N$, of 250 to 5,300 (preferably, 500 to 1,500; more preferably, 750 to 1,200; most preferably, 800 to 1,000) Daltons.

Preferably, the polyalkylene glycol used in the free standing dispersant film of the present invention is a random copolymer of ethylene oxide and propylene oxide. More preferably, the polyalkylene glycol used in the free standing dispersant film of the present invention is a random copolymer of ethylene oxide and propylene oxide, wherein the polyalkylene glycol has a number average molecular weight, $M_N$, of 250 to 5,300 Daltons. Still more preferably, the polyalkylene glycol used in the free standing dispersant film of the present invention is a random copolymer of ethylene oxide and propylene oxide, wherein the polyalkylene glycol has a number average molecular weight, $M_N$, of 500 to 1,500 Daltons. Yet still more preferably, the polyalkylene glycol used in the free standing dispersant film of the present invention is a random copolymer of ethylene oxide and propylene oxide, wherein the polyalkylene glycol has a number average molecular weight, $M_N$, of 750 to 1,200 Daltons. Most preferably, the polyalkylene glycol used in the free standing dispersant film of the present invention is a random copolymer of ethylene oxide and propylene oxide, wherein the polyalkylene glycol has a number average molecular weight, $M_N$, of 800 to 1,000 Daltons.

Preferably, the free standing dispersant film of the present invention, comprises 1 to 35 wt % of the polyalkylene glycol, based on weight of the free standing dispersant film, wherein the polyalkylene glycol used is a random copolymer of ethylene oxide and propylene oxide and has a number average molecular weight, $M_N$, of 250 to 5,300 (preferably, 500 to 1,500; more preferably, 750 to 1,200; most preferably, 800 to 1,000) Daltons. More preferably, the free standing dispersant film of the present invention, comprises 2 to 35 wt % of the polyalkylene glycol, based on weight of the free standing dispersant film, wherein the polyalkylene glycol used is a random copolymer of ethylene oxide and propylene oxide and has a number average molecular weight, $M_N$, of 250 to 5,300 (preferably, 500 to 1,500; more preferably, 750 to 1,200; most preferably, 800 to 1,000) Daltons. Still more preferably, the free standing dispersant film of the present invention, comprises 2.5 to 10 wt % of the polyalkylene glycol, based on weight of the free standing dispersant film, wherein the polyalkylene glycol used is a random copolymer of ethylene oxide and propylene oxide and has a number average molecular weight, $M_N$, of 250 to 5,300 (preferably, 500 to 1,500; more preferably, 750 to 1,200; most preferably, 800 to 1,000) Daltons. Most preferably, the free standing dispersant film of the present invention, comprises 3 to 5 wt % of the polyalkylene glycol, based on weight of the free standing dispersant film, wherein the polyalkylene glycol used is a random copolymer of ethylene oxide and propylene oxide and has a number average molecular weight, $M_N$, of 250 to 5,300 (preferably, 500 to 1,500; more preferably, 750 to 1,200; most preferably, 800 to 1,000) Daltons.

Preferably, the free standing dispersant film of the present invention, comprises 0.5 to 25 wt % of a plasticizer, based on weight of the free standing dispersant film. More preferably, the free standing dispersant film of the present invention, comprises 5 to 25 wt % of a plasticizer, based on weight of the free standing dispersant film. Still more preferably, the free standing dispersant film of the present invention, comprises 7.5 to 20 wt % of a plasticizer, based on weight of the free standing dispersant film. Most preferably, the free standing dispersant film of the present invention, comprises 10 to 20 wt % of a plasticizer, based on weight of the free standing dispersant film.

Preferably, the plasticizer used in the free standing dispersant film of the present invention is selected from organic triols, diols and glycols. More preferably, the plasticizer used in the free standing dispersant film of the present invention is selected from the group consisting of 1,2-ethanediol; 1,3-propanediol; 1,2-propanediol; 1,2,3-propanetriol; 1,4-butanediol; 1,5-pentanediol; 1,6-hexanediol; 2,3-butanediol; 1,3-butanediol; 2-methyl-1,3-propanediol; diethylene glycol; triethylene glycol; and mixtures thereof. Still more preferably, the plasticizer used in the free standing dispersant film of the present invention is selected from the group consisting of 1,2-ethanediol; 1,3-propanediol; 1,2-propanediol; 1,2,3-propanetriol; 1,4-butanediol; 1,5-pentanediol; 1,6-hexanediol; 2,3-butanediol; 1,3-butanediol and mixtures thereof. Most preferably, the plasticizer used in the free standing dispersant film of the present invention is 1,4-butanediol and 1,2,3-propanetriol.

Preferably, the free standing dispersant film of the present invention, comprises 2 to 50 wt % of the dispersant polymer, based on weight of the free standing dispersant film. More preferably, the free standing dispersant film of the present invention, comprises 2.25 to 25 wt % of the dispersant polymer, based on weight of the free standing dispersant film. Still more preferably, the free standing dispersant film of the present invention, comprises 2.5 to 20 wt % of the dispersant polymer, based on weight of the free standing dispersant film. Most preferably, the free standing dispersant film of the present invention, comprises 3 to 6 wt % of the dispersant polymer, based on weight of the free standing dispersant film.

Preferably, the free standing dispersant film of the present invention, comprises 2 to 50 wt % of the dispersant polymer, based on weight of the free standing dispersant film; wherein the dispersant polymer used is at least partially neutralized (preferably, wherein the degree of neutralization is 60 to 100% (more preferably, 70 to 100%; most preferably, 75 to 100%)). More preferably, the free standing dispersant film of the present invention, comprises 2.25 to 25 wt % of the dispersant polymer, based on weight of the free standing dispersant film; wherein the dispersant polymer used is at least partially neutralized (preferably, wherein the degree of neutralization is 60 to 100% (more preferably, 70 to 100%; most preferably, 75 to 100%)). Still more preferably, the free standing dispersant film of the present invention, comprises 2.5 to 20 wt % of the dispersant polymer, based on weight of the free standing dispersant film; wherein the dispersant polymer used is at least partially neutralized (preferably, wherein the degree of neutralization is 60 to 100% (more preferably, 70 to 100%; most preferably, 75 to 100%)). Most preferably, the free standing dispersant film of the present invention, comprises 3 to 6 wt % of the dispersant polymer, based on weight of the free standing dispersant film; wherein the dispersant polymer used is at least partially neutralized (preferably, wherein the degree of neutralization is 60 to 100% (more preferably, 70 to 100%; most preferably, 75 to 100%)).

Preferably, the free standing dispersant film of the present invention, comprises 2 to 50 wt % of the dispersant polymer, based on weight of the free standing dispersant film; wherein the dispersant polymer used is at least partially neutralized (preferably, wherein the degree of neutralization is 60 to 100% (more preferably, 70 to 100%; most preferably, 75 to 100%)); wherein the dispersant polymer used has a weight average molecular weight of 2,000 to 50,000 (preferably, 5,000 to 35,000; more preferably, 7,000 to 30,000; most preferably, 15,000 to 25,000) Daltons. More preferably, the free standing dispersant film of the present invention, comprises 2.25 to 25 wt % of the dispersant polymer, based on weight of the free standing dispersant film; wherein the dispersant polymer used is at least partially neutralized (preferably, wherein the degree of neutralization is 60 to 100% (more preferably, 70 to 100%; most preferably, 75 to 100%)); wherein the dispersant polymer used has a weight average molecular weight of 2,000 to 50,000 (preferably, 5,000 to 35,000; more preferably, 7,000 to 30,000; most preferably, 15,000 to 25,000) Daltons. Still more preferably, the free standing dispersant film of the present invention, comprises 2.5 to 20 wt % of the dispersant polymer, based on weight of the free standing dispersant film; wherein the dispersant polymer used is at least partially neutralized (preferably, wherein the degree of neutralization is 60 to 100% (more preferably, 70 to 100%; most preferably, 75 to 100%)); wherein the dispersant polymer used has a weight average molecular weight of 2,000 to 50,000 (preferably, 5,000 to 35,000; more preferably, 7,000 to 30,000; most preferably, 15,000 to 25,000) Daltons. Most preferably, the free standing dispersant film of the present invention, comprises 3 to 6 wt % of the dispersant polymer, based on weight of the free standing dispersant film; wherein the dispersant polymer used is at least partially neutralized (preferably, wherein the degree of neutralization is 60 to 100% (more preferably, 70 to 100%; most preferably, 75 to 100%)); wherein the dispersant polymer used has a weight average molecular weight of 2,000 to 50,000 (preferably, 5,000 to 35,000; more preferably, 7,000 to 30,000; most preferably, 15,000 to 25,000) Daltons.

Preferably, the dispersant polymer used in the free standing dispersant film of the present invention is a homopolymer or copolymer of (meth)acrylic acid having a weight average molecular weight of 2,000 to 50,000 Daltons. More preferably, the dispersant polymer used in the free standing dispersant film of the present invention is a homopolymer or copolymer of (meth)acrylic acid having a weight average molecular weight of 5,000 to 35,000 Daltons. Still more preferably, the dispersant polymer used in the free standing dispersant film of the present invention is a homopolymer or copolymer of (meth)acrylic acid having a weight average molecular weight of 7,000 to 30,000 Daltons. Most preferably, the dispersant polymer used in the free standing dispersant film of the present invention is a homopolymer or copolymer of (meth)acrylic acid having a weight average molecular weight of 15,000 to 25,000 Daltons.

Preferably, the dispersant polymer used in the free standing dispersant film of the present invention is a copolymer containing polymerized units of (meth)acrylic acid and of co-monomers that provide alternative functionality into the dispersant polymer, for example, sulfonated, dicarboxylic or hydrophobic moieties.

Preferably, the dispersant polymer used in the free standing dispersant film of the present invention is an amphoteric dispersant polymer, comprising polymerized units of an anionic vinyl monomer and a cationic vinyl monomer. Preferably, the dispersant polymer used in the free standing dispersant film of the present invention is an amphoteric dispersant polymer, comprising polymerized units of an anionic vinyl monomer and a cationic monomer; wherein the anionic vinyl monomer is selected from at least one of acrylic acid, methacrylic acid, itaconic acid, aconitic acid, hydroxy acrylic acid, maleic acid anhydride, fumaric acid, vinyl sulfonic acid, allyl sulfonic acid, meth allyl sulfonic acid, styrene sulfonic acid and 2-acrylamido-2-methylpropane-sulfonic acid. More preferably, the dispersant polymer used in the free standing dispersant film of the present invention is an amphoteric dispersant polymer, comprising polymerized units of an anionic vinyl monomer and a cationic monomer; wherein the anionic vinyl monomer is selected from at least one of acrylic acid and methacrylic acid. Most preferably, the dispersant polymer used in the free standing dispersant film of the present invention is an amphoteric dispersant polymer, comprising polymerized units of an anionic vinyl monomer and a cationic monomer; wherein the anionic vinyl monomer is acrylic acid.

Preferably, the dispersant polymer used in the free standing dispersant film of the present invention is an amphoteric dispersant polymer, comprising polymerized units of an anionic vinyl monomer and a cationic vinyl monomer; wherein the cationic vinyl monomer contains at least one tertiary amine nitrogen atom. More preferably, the dispersant polymer used in the free standing dispersant film of the present invention is an amphoteric dispersant polymer, comprising polymerized units of an anionic vinyl monomer (preferably, acrylic acid) and a cationic vinyl monomer; wherein the cationic vinyl monomer contains at least one tertiary amine nitrogen atom. Yet preferably, the dispersant polymer used in the free standing dispersant film of the present invention is an amphoteric dispersant polymer, comprising polymerized units of an anionic vinyl monomer and a cationic vinyl monomer; wherein the cationic vinyl monomer contains at least one tertiary amine nitrogen atom and wherein the amphoteric dispersant polymer does not contain quaternary amine functionality. Still more preferably, the dispersant polymer used in the free standing dispersant film of the present invention is an amphoteric dispersant polymer, comprising polymerized units of an anionic vinyl monomer (preferably, acrylic acid) and a cationic vinyl monomer; wherein the cationic vinyl monomer is selected from at least one of 2-vinylpyridine, 4-vinylpyridine, dimethylaminoethyl methacrylate, diethylaminoethyl methacrylate, dipropylaminoethyl methacrylate, dimethylaminopropyl methacrylamide, allyldimethylamine, allyldiethylamine, allyldipropylamine, methallyldimethylamine, methallyldiethylamine, methallyldipropylamine and methylated, ethylated or propylated derivatives thereof; and wherein the amphoteric dispersant polymer does not contain quaternary amine functionality. Yet still more preferably, the dispersant polymer used in the free standing dispersant film of the present invention is an amphoteric dispersant polymer, comprising polymerized units of an anionic vinyl monomer (preferably, acrylic acid) and a cationic vinyl monomer; wherein the cationic monomer is selected from at least one of dimethylaminoethyl methacrylate, diethylaminoethyl methacrylate, dipropylaminoethyl methacrylate and dimethylaminopropyl methacrylamide; and wherein the amphoteric dispersant polymer does not contain quaternary amine functionality. Most preferably, the dispersant polymer used in the free standing dispersant film of the present invention is an amphoteric dispersant polymer, comprising polymerized units of an anionic vinyl monomer (preferably, acrylic acid) and a cationic vinyl monomer; wherein the cationic monomer is selected from at least one of 2-(dimethylamino)ethyl methacrylate (DMAEMA), 2-(diethylamino)ethyl methacrylate (DEAEMA) and 2-(dipropylamino)ethyl methacrylate (DPAEMA); and wherein the amphoteric dispersant polymer does not contain quaternary amine functionality.

Preferably, the dispersant polymer used in the free standing dispersant film of the present invention is at least partially neutralized with at least one of an alkali earth metal hydroxide, an alkaline earth metal hydroxide and an ionomer, wherein the degree of neutralization is 60 to 100% (more preferably, 70 to 100%; most preferably, 75 to 100%). More preferably, the dispersant polymer used in the free standing dispersant film of the present invention is at least partially neutralized with at least one of an alkali earth metal hydroxide and an alkaline earth metal hydroxide, wherein the degree of neutralization is 60 to 100% (more preferably, 70 to 100%; most preferably, 75 to 100%). Most preferably, the dispersant polymer used in the free standing dispersant film of the present invention is at least partially neutralized with at least one of sodium hydroxide, potassium hydroxide, magnesium hydroxide and calcium hydroxide, wherein the degree of neutralization is 60 to 100% (more preferably, 70 to 100%; most preferably, 75 to 100%).

Preferably, the free standing dispersant film of the present invention, further comprises 0 to 1.8 wt % (more preferably, 0.01 to 1.8 wt %) of a polyvinyl pyrrolidone, wherein the weight ratio of the partially hydrolyzed polyvinyl acetate to the polyvinyl pyrrolidone is >10:1 (preferably, at least 100:1; more preferably, at least 150:1; most preferably, 150:1 to 600:1). More preferably, the free standing dispersant film of the present invention, comprises 0.01 to 1.0 wt % of a polyvinyl pyrrolidone, wherein the weight ratio of the partially hydrolyzed polyvinyl acetate to the polyvinyl pyrrolidone is >10:1 (preferably, at least 100:1; more preferably, at least 150:1; most preferably, 150:1 to 600:1). Still more preferably, the free standing dispersant film of the present invention, comprises 0.05 to 0.5 wt % of a polyvinyl pyrrolidone, wherein the weight ratio of the partially hydrolyzed polyvinyl acetate to the polyvinyl pyrrolidone is >10:1 (preferably, at least 100:1; more preferably, at least 150:1; most preferably, 150:1 to 600:1). Most preferably, the free standing dispersant film of the present invention, comprises 0.08 to 0.20 wt % of a polyvinyl pyrrolidone, wherein the weight ratio of the partially hydrolyzed polyvinyl acetate to the polyvinyl pyrrolidone is >10:1 (preferably, at least 100:1; more preferably, at least 150:1; most preferably, 150:1 to 600:1).

Preferably, the polyvinyl pyrrolidone used in the free standing dispersant film of the present invention has a weight average molecular weight of 5,000 to 2,000,000 Daltons. More preferably, the polyvinyl pyrrolidone used in the free standing dispersant film of the present invention has a weight average molecular weight of 10,000 to 1,500,000 Daltons. Still more preferably, the polyvinyl pyrrolidone used in the free standing dispersant film of the present invention has a weight average molecular weight of 20,000 to 100,000 Daltons. Most preferably, the polyvinyl pyrrolidone used in the free standing dispersant film of the present invention has a weight average molecular weight of 20,000 to 50,000 Daltons.

Preferably, the free standing dispersant film of the present invention, comprises 0 to 1.8 wt % of a polyvinyl pyrrolidone, wherein the polyvinyl pyrrolidone used has a weight average molecular weight of 5,000 to 2,000,000 (preferably, 10,000 to 1,500,000; more preferably, 20,000 to 100,000; most preferably 20,000 to 50,000) Daltons and wherein the weight ratio of the partially hydrolyzed polyvinyl acetate to the polyvinyl pyrrolidone is >10:1 (preferably, at least 100:1; more preferably, at least 150:1; most preferably, 150:1 to 600:1). More preferably, the free standing dispersant film of the present invention, comprises 0.01 to 1.0 wt % of a polyvinyl pyrrolidone, wherein the polyvinyl pyrrolidone used has a weight average molecular weight of 5,000 to 2,000,000 (preferably, 10,000 to 1,500,000; more preferably, 20,000 to 100,000; most preferably, 20,000 to 50,000) Daltons and wherein the weight ratio of the partially hydrolyzed polyvinyl acetate to the polyvinyl pyrrolidone is >10:1 (preferably, at least 100:1; more preferably, at least 150:1; most preferably, 150:1 to 600:1). Still more preferably, the free standing dispersant film of the present invention, comprises 0.05 to 0.50 wt % of a polyvinyl pyrrolidone, wherein the polyvinyl pyrrolidone used has a weight average molecular weight of 5,000 to 2,000,000 (preferably, 10,000 to 1,500,000; more preferably, 20,000 to 100,000; most preferably 20,000 to 50,000) Daltons and wherein the weight ratio of the partially hydrolyzed polyvinyl acetate to the polyvinyl pyrrolidone is >10:1 (preferably, at least 100:1; more preferably, at least 150:1; most preferably, 150:1 to 600:1). Most preferably, the free standing dispersant film of the present invention, comprises 0.08 to 0.20 wt % of a polyvinyl pyrrolidone, wherein the polyvinyl pyrrolidone used has a weight average molecular weight of 5,000 to 2,000,000 (preferably, 10,000 to 1,500,000; more preferably, 20,000 to 100,000; most preferably 20,000 to 50,000) Daltons and wherein the weight ratio of the partially hydrolyzed polyvinyl acetate to the polyvinyl pyrrolidone is >10:1 (preferably, at least 100:1; more preferably, at least 150:1; most preferably, 150:1 to 600:1).

The free standing dispersant film of the present invention, optionally, further comprises 0 to 10 wt % of a poly(isobutylene-co-maleic anhydride) copolymer, wherein the poly(isobutylene-co-maleic anhydride) copolymer is at least partially neutralized (preferably, wherein the degree of neutralization is 50 to 100% (more preferably, 75 to 100%; most preferably, 95 to 100%). More preferably, the free standing dispersant film of the present invention, optionally, further comprises 1 to 7.5 wt % of a poly(isobutylene-co-maleic anhydride) copolymer, wherein the poly(isobutylene-co-maleic anhydride) copolymer is at least partially neutralized (preferably, wherein the degree of neutralization is 50 to 100% (more preferably, 75 to 100%; most preferably, 95 to 100%). Still more preferably, the free standing dispersant film of the present invention, optionally, further comprises 3 to 6 wt % of a poly(isobutylene-co-maleic anhydride) copolymer, wherein the poly(isobutylene-co-maleic anhydride) copolymer is at least partially neutralized (preferably, wherein the degree of neutralization is 50 to 100% (more preferably, 75 to 100%; most preferably, 95 to 100%). Most preferably, the free standing dispersant film of the present invention, optionally, further comprises 4 to 5.5 wt % of a poly(isobutylene-co-maleic anhydride) copolymer, wherein the poly(isobutylene-co-maleic anhydride) copolymer is at least partially neutralized (preferably, wherein the degree of neutralization is 50 to 100% (more preferably, 75 to 100%; most preferably, 95 to 100%).

Preferably, the poly(isobutylene-co-maleic anhydride) copolymer optionally used in the free standing dispersant film of the present invention has a weight average molecular weight of 50,000 to 500,000 Daltons. More preferably, the poly(isobutylene-co-maleic anhydride) copolymer optionally used in the free standing dispersant film of the present invention has a weight average molecular weight of 75,000 to 250,000 Daltons. Still more preferably, the poly(isobutylene-co-maleic anhydride) copolymer optionally used in the free standing dispersant film of the present invention has a weight average molecular weight of 100,000 to 200,000 Daltons. Most preferably, the poly(isobutylene-co-maleic anhydride) copolymer optionally used in the free standing dispersant film of the present invention has a weight average molecular weight of 140,000 to 180,000 Daltons.

The free standing dispersant film of the present invention, optionally, further comprises 0 to 10 wt % of a poly(isobutylene-co-maleic anhydride) copolymer, wherein the poly(isobutylene-co-maleic anhydride) copolymer used is at least partially neutralized (preferably, wherein the degree of neutralization is 50 to 100% (more preferably, 75 to 100%; most preferably, 95 to 100%) and has a weight average molecular weight of 50,000 to 500,000 (preferably, 75,000 to 250,000; more preferably, 100,000 to 200,000; most preferably, 140,000 to 180,000) Daltons. More preferably, the free standing dispersant film of the present invention, optionally, further comprises 1 to 7.5 wt % of a poly(isobutylene-co-maleic anhydride) copolymer, wherein the poly(isobutylene-co-maleic anhydride) copolymer used is at least partially neutralized (preferably, wherein the degree of neutralization is 50 to 100% (more preferably, 75 to 100%; most preferably, 95 to 100%) and has a weight average molecular weight of 50,000 to 500,000 (preferably, 75,000 to 250,000; more preferably, 100,000 to 200,000; most preferably, 140,000 to 180,000) Daltons. Still more preferably, the free standing dispersant film of the present invention, optionally, further comprises 3 to 6 wt % of a poly(isobutylene-co-maleic anhydride) copolymer, wherein the poly(isobutylene-co-maleic anhydride) copolymer used is at least partially neutralized (preferably, wherein the degree of neutralization is 50 to 100% (more preferably, 75 to 100%; most preferably, 95 to 100%) and has a weight average molecular weight of 50,000 to 500,000 (preferably, 75,000 to 250,000; more preferably, 100,000 to 200,000; most preferably, 140,000 to 180,000) Daltons. Most preferably, the free standing dispersant film of the present invention, optionally, further comprises 4 to 5.5 wt % of a poly (isobutylene-co-maleic anhydride) copolymer, wherein the poly(isobutylene-co-maleic anhydride) copolymer used is at least partially neutralized (preferably, wherein the degree of neutralization is 50 to 100% (more preferably, 75 to 100%; most preferably, 95 to 100%) and has a weight average molecular weight of 50,000 to 500,000 (preferably, 75,000 to 250,000; more preferably, 100,000 to 200,000; most preferably, 140,000 to 180,000) Daltons.

Preferably, the poly(isobutylene-co-maleic anhydride) copolymer optionally used is at least partially neutralized with at least one of an alkali earth metal hydroxide, an alkaline earth metal hydroxide and an ionomer, wherein the degree of neutralization is 50 to 100% (more preferably, 75 to 100%; most preferably, 95 to 100%). More preferably, the poly(isobutylene-co-maleic anhydride) copolymer optionally used is at least partially neutralized with at least one of an alkali earth metal hydroxide and an alkaline earth metal hydroxide, wherein the degree of neutralization is 50 to 100% (more preferably, 75 to 100%; most preferably, 95 to 100%). Most preferably, the poly(isobutylene-co-maleic anhydride) copolymer optionally used is at least partially neutralized with at least one of sodium hydroxide, potassium hydroxide, magnesium hydroxide and calcium hydroxide, wherein the degree of neutralization is 50 to 100% (more preferably, 75 to 100%; most preferably, 95 to 100%).

Preferably, the free standing dispersant film of the present invention, comprises 0 to 10 wt % of an optional additive. Preferably, the optional additive used in the free standing dispersant film of the present invention is selected from the group consisting of a preservative, an antioxidant, a viscosity modifier, a solubility modifier, an antimicrobial agent, a binder, a chelating, a filler, an extender, a crosslinking agent (e.g., a bivalent metal cation), a defoamer, a salt, a lubricant, a release agent, an anti-blocking agent, a tackifier, a coalescent, a detackifying agent and a nanoparticle (e.g., silicate type nanoclay).

Preferably, the free standing dispersant film of the present invention, comprises 0 to 10 wt % of an optional additive, wherein the optional additive includes a nanoparticle (preferably, a silicate type nanoclay). More preferably, the free standing dispersant film of the present invention, comprises 0.05 to 1 wt % (more preferably, 0.1 to 0.6 wt %; most preferably, 0.1 to 0.5 wt %) of a nanoparticle (preferably, a silicate type nanoclay). Most preferably, the free standing dispersant film of the present invention, comprises 0.1 to 0.5 wt % of a nanoparticle (preferably, a silicate type nanoclay).

Preferably, the free standing dispersant film of the present invention, comprises 0 to 10 wt % of an optional additive, wherein the optional additive includes a defoamer. More preferably, the free standing dispersant film of the present invention, comprises 1 to 10 wt % (more preferably, 2 to 7.5 wt %; most preferably, 3 to 6 wt %) of an defoamer. Most preferably, the free standing dispersant film of the present invention comprises 3 to 6 wt % of a defoamer.

Preferably, the free standing dispersant film of the present invention, comprises 0 to 10 wt % of an optional additive, wherein the optional additive includes a crosslinking agent. More preferably, the free standing dispersant film of the present invention, comprises 0 to 5 wt % (more preferably, 0 to 3 wt %; most preferably, 0 to 1 wt %) of a crosslinking agent.

Preferably, the crosslinking agent used in the free standing dispersant film of the present invention is an ionic crosslinking agent. More preferably, the crosslinking agent used in the free standing dispersant film of the present invention is selected from the group of cations consisting of $Ca^{2+}$, $Mg^{2+}$, $Al^{2+}$, $Al^{3+}$, $Zn^{2+}$ and mixtures thereof. Still more preferably, the crosslinking agent used in the free standing dispersant film of the present invention is selected from the group of cations consisting of $Ca^{2+}$, $Zn^{2+}$ and mixtures thereof. Preferably, the cations are provided as a water soluble inorganic salt or complex, for example, $CaCl_2$, $ZnO$, Zinc ammonium bicarbonate.

Preferably, the free standing dispersant film of the present invention is water soluble.

Preferably, the free standing dispersant film of the present invention is cold water soluble.

Preferably, the free standing dispersant film of the present invention is homogeneous.

The water soluble films of the present invention can be prepared by techniques known to those skilled in the art including, for example, via solution casting on a substrate, such as glass, polyethylene terephthalate (PET) or metal. Typically, water is used as the solvent for the solution casting, although other solvents may be used. Following casting, the films may be dried by heating at elevated temperature, for instance 65-80° C.

The free standing dispersant film of the present invention has utility as a water soluble (preferably, cold water soluble) packaging film that facilitates dosing of materials, for example, a premeasured unit dose of a household care composition, such as, a dish or laundry detergent formulation. Preferably, the free standing dispersant film of the present invention forms a cavity. More preferably, the free standing dispersant film of the present invention forms a cavity, wherein the cavity is encapsulated by the free standing dispersant film.

Preferably, the unit dose package of the present invention, comprises: a free standing dispersant film of the present invention; and a detergent formulation. More preferably, the unit dose package of the present invention, comprises: a free standing dispersant film of the present invention; and a detergent formulation; wherein the free standing dispersant film forms a cavity; wherein the detergent formulation is disposed within the cavity; and wherein the detergent formulation is in contact with the free standing dispersant film. Most preferably, the unit dose package of the present invention, comprises: a free standing dispersant film of the present invention; and a detergent formulation; wherein the free standing dispersant film forms a cavity; wherein the detergent formulation is disposed within the cavity; wherein the free standing dispersant film encapsulates the cavity; and wherein the detergent formulation is in contact with the free standing dispersant film.

Preferably, the detergent formulation used in the unit dose package of the present invention, comprises: 14 to 60 wt % (preferably, 20 to 50 wt %; more preferably, 25 to 47.5 wt %; still more preferably, 30 to 45 wt %; most preferably, 40 to 42 wt %) of a surfactant; 3 to 25 wt % (preferably, 3 to 20 wt %; more preferably, 4 to 15 wt %; still more preferably, 5 to 10 wt %; most preferably, 5 to 7 wt %) of a salt; and 20 to 75 wt % (preferably, 30 to 70 wt % water; more preferably, 40 to 65 wt %; most preferably, 45 to 60 wt %) of a water; wherein the free standing dispersant film forms a cavity; wherein the detergent formulation is disposed within the cavity; and wherein the detergent formulation is in contact with the free standing dispersant film.

Preferably, the surfactant used in the detergent formulation in the unit dose package of the present invention is selected from the group consisting of cationic, anionic, nonionic, fatty acid metal salt, zwitterionic (e.g., betaine surfactants) and mixtures thereof.

The amount of salt noted in the detergent formulation does not include any anionic or cationic surfactants present in the detergent.

Preferably, the salt used in the detergent formulation in the unit dose package of the present invention has no more than ten (more preferably, no more than six; most preferably, no more than 3) carbon atoms. Preferably, the salt used in the detergent formulation in the unit dose package of the present invention is selected from the group consisting of chlorides, citrates, phosphates, sulfates, carbonates, metalsilicates and aluminosilicates. Preferably, the cations of the salt used in the detergent formulation in the unit dose package of the present invention are selected from alkali metal ions, ammonium ions and mixtures thereof. Preferably, the detergent formulation used in the unit dose package of the present invention, comprises a salt selected from the group consisting of sodium chloride, ammonium chloride and ammonium sulfate. More preferably, the detergent formulation used in the unit dose package of the present invention, comprises a salt selected from the group consisting of sodium chloride, ammonium chloride and mixtures thereof.

Preferably, the detergent formulation used in the unit dose package of the present invention, further comprises an optional component selected from the group consisting of a preservative, an antioxidant, a viscosity modifier, a solubility modifier, an antimicrobial agent, a binder, a chelating agent, a fungicide, an aesthetics enhancer and a filler.

Preferably, the pH of the detergent formulation used in the unit dose package of the present invention is 4.5 to 11 (more preferably, 7 to 10). Suitable bases to adjust the pH of the detergent formulation include mineral bases such as sodium hydroxide and potassium hydroxide; ammonium hydroxide; and organic bases such as mono-, di- or tri-ethanolamine; or 2-dimethylamino-2-methyl-1-propanol (DMAMP). Mixtures of bases may be used.

The water soluble film used in the unit dose package of the present invention is stable in the presence of high ionic strength detergents (containing salts in amounts as described above). In use, the detergent contents of the unit dose package of the present invention may be released by exposing the unit dose package to low ionic strength water (e.g., containing less than 3 wt % salts), for instance as may be encountered during the wash cycle of a laundry machine. Following such exposure, the water soluble film will readily disintegrate, releasing the detergent formulation into the surroundings.

Preferably, the water soluble film used in the unit dose package of the present invention forms a sealed container containing the detergent formulation. The sealed container can be formed by any suitable method, including such processes and features as heat sealing, solvent welding, and adhesive sealing solution (e.g., with use of a water-soluble adhesive).

Some embodiments of the present invention will now be described in detail in the following Examples.

Some embodiments of the present invention will now be described in detail in the following Examples.

Film Forming Compositions

Film forming compositions were prepared for each of Compositions of FC1 and F1-F3 by mixing together the components in the weight proportions listed in TABLE 1.

TABLE 1

| Film Comp. | a (wt %) | b (wt %) | c (wt %) | d1 (wt %) | d2 (wt %) | e1 (wt %) | e2 (wt %) | e3 (wt %) | f (wt %) | g (wt %) | h (wt %) |
|---|---|---|---|---|---|---|---|---|---|---|---|
| FC1 | 61.07 | 12.10 | 4.11 | 1.66 | 15.50 | — | — | — | 0.12 | 0.30 | 5.15 |
| F1 | 58.23 | 11.56 | 3.94 | 1.56 | 14.65 | 4.73 | — | — | 0.11 | 0.26 | 4.95 |
| F2 | 58.51 | 11.59 | 3.93 | 1.59 | 14.85 | — | 4.18 | — | 0.12 | 0.28 | 4.94 |
| F3 | 58.18 | 11.55 | 3.73 | 1.70 | 14.78 | — | — | 4.75 | 0.11 | 0.27 | 4.95 | a - poly(vinyl alcohol), weight average molecular weight, $M_W$, of 150,000 Daltons and 88% hydrolyzed available from Sigma-Aldrich
b - Polyox™ WSR N3000 poly(ethylene oxide) with a weight average molecular weight of 400,000 Daltons available from The Dow Chemical Company
c - UCON 75-H-450 ethylene oxide and propylene oxide copolymer, number average molecular weight, $M_N$, of 980 Daltons avalable from The Dow Chemical Company.
d1 - 1,4-butanediol (100%) plasticizer available from Alfa Aesar
d2 - Glycerol (100%) plasticizer available from Sigma-Aldrich
e1 - Acusol™ 445N homopolymer of acrylic acid with a weight average molecular weight, $M_W$, 4,500 Daltons available from The Dow Chemical Company
e2 - Acusol™ 588 copolymer of acrylic and sulfonic acids with a weight average molecular weight, $M_W$, 12,000 available from The Dow Chemical Company
e3 - An 80 wt % acrylic acid/20 wt % 2-(dimethylamino)ethyl methacrylate copolymer produced by conventional aqueous polymerization and 75% neutralized with NaOH.
f - poly(vinyl pyrrolidone) with a weight average molecular weight of 29,000 Daltons commercially available from Acros Organics
g - CLOSITE NA⁺ nanoclay (bentonite/montmorillonite) commercially available from BKY Additives Ltd.
h - BYK-016 defoamer available from BYK, USA Inc.

Comparative Example C1 and Examples 1-3

A film was prepared in each of Comparative Example C1 and Examples 1-3 by casting 15 to 25 grams of the film forming composition of FC1 and F1-F3, respectively as noted in TABLE 2, onto a polyethylene terephthalate substrate using a stainless steel draw down bar to form a dried film with a target thickness of 76 μm. The drawn films were immediately transferred to a forced air oven and dried at 65-95° C. for 10 to 15 minutes to form a dried film. The dried films were then removed from the oven and left to equilibrate to room temperature for several hours. Once the films were equilibrated to room temperature, the films were released from the polyethylene terephthalate substrate to provide free standing films 60 to 90 μm thick.

TABLE 2

| Ex. | Film composition |
|---|---|
| C1 | FC1 |
| 1 | F1 |
| 2 | F2 |
| 3 | F3 |

Cold Water Solubility Testing

A commercially available modified polyvinyl hydroxide film and the free standing films from Comparative Example C1 and Examples 1-3 were tested for cold water solubility both initially after making and after storage at ambient temperatures (68-72° F.) and high relative humidity (68-70%). The cold water solubility tests were done by taking test strips (0.5" wide×1.5" long) from each free standing film and placing same into a separate container with 20 mL of tap water. The test strips were allowed to sit undisturbed for approximately 2 mins before shaking the container for 60 seconds by hand. The container contents were then filtered through a 25 μm mesh screen. The following rating scale based on observation of the container contents pre-filtering and of the residue on the mesh screen was used to characterize the overall cold water solubility for the subject free standing films.

Excellent=Clear solution, no residue on screen
Very Good=Slight haze, no residue on screen
Good=low residue/fine grit on screen
Fair=large amount of residue/grit on screen
Poor=large intact film fragments on screen The results of the analyses are provided in TABLE 3.

TABLE 3

| Film Tested | Cold water solubility | |
|---|---|---|
| | Initial | Aged |
| modified polyvinyl hydroxide film* | Very Good | Very Good |
| C1 | Very Good | Good |
| 1 | Very Good | Fair |
| 2 | Very Good | Very Good |
| 3 | Very Good | Very Good |

*Monosol ™ M8630 modified polyvinyl hydroxide film available from MonoSol LLC

Properties Testing

Mechanical properties of water soluble films believed useful in thermoforming water-soluble containers, include Tensile Stress at 100% elongation, Young's Modulus and Break Stress are critical for successful thermoforming and also in the film's ability to hold the required amount of liquid detergent. Mechanical properties of the commercially available modified polyvinyl hydroxide film and the free standing films from Comparative Example C1 and Examples 1-3 were measured using a Tinius Olsen Model H10K-S benchtop materials tester available from Tinius Olsen and film samples (3.0 inch long×0.5 inch wide). The tensile testing was performed according to ASTM D882 using a 1.2 inch gauge length at a test speed of 20 inch/min under ambient conditions in a controlled temperature and humidity room with a temperature and humidity of 71° F. and 53% relative humidity. The results of the analyses are provided in TABLE 4.

TABLE 4

| Film | Tensile Properties | | | |
|---|---|---|---|---|
| | Elongation (%) | Stress @ 100% Elongation (MPa) | Ultimate Break Stress (MPa) | Young's Modulus (MPa) |
| modified polyvinyl hydroxide film* | 856 | 8.5 | 40.1 | 17.0 |
| Comparative Example FC1 | 626 | 6.1 | 24.6 | 16.7 |
| Example 1 | 454 | 7.0 | 23.7 | 25.1 |
| Example 2 | 481 | 6.8 | 23.9 | 20.0 |
| Example 3 | 563 | 5.2 | 19.1 | 14.4 |

*Monosol ™ M8630 modified polyvinyl hydroxide film available from MonoSol LLC.

Comparative Examples C2-C3 and Examples 4-5: Dispersant Carbonate Scale Inhibition Test solutions were prepared by dissolving in water sodium carbonate and a film composition (as noted in TABLE 5) to provide 100 mL of a solution containing 500 ppm sodium carbonate and 100 ppm of the dissolved film. The test solutions were maintained at room temperature and turbidity was continuously measured using a Brinkmann Probe Colorimeter (PC950). The transmittance was recorded as 100% at time=0, and 0.1 gram of a 2:1 $Ca^{2+}/Mg^{2+}$ hardness solution was added into the test solutions each minute and turbidity was recorded. The 0.1 gram/minute 2:1 $Ca^{2+}/Mg^{2+}$ hardness solution additions continued until the transmittance measurement fell below 40% or after 20 minutes, whichever occurred first. The results are provided in TABLE 5.

Comparative Examples C4-05 and Examples 6-7: Dispersant Silicate Scale Inhibition Test solutions were prepared by dissolving in water sodium silicate and a film composition (as noted in TABLE 5) to provide 100 mL of a solution containing 500 ppm sodium silicate and 100 ppm of the dissolved film. The test solutions were maintained at room temperature and turbidity was continuously measured using a Brinkmann Probe Colorimeter (PC950). The transmittance was recorded as 100% at time=0, and 0.1 gram of a 2:1 $Ca^{2+}/Mg^{2+}$ hardness solution was added into the test solutions each minute and turbidity was recorded. The 0.1 gram/minute 2:1 $Ca^{2+}/Mg^{2+}$ hardness solution additions continued until the transmittance measurement fell below 40% or after 20 minutes, whichever occurred first. The results are provided in TABLE 5.

TABLE 5

| Test Solution | Type Scale | Film | Time at transmittance level, T | | |
|---|---|---|---|---|---|
| | | | T = 90% | T = 60% | T = 40% |
| Comp. Example C2 | Carbonate | * | 1-2 min | 2-3 min | 2-3 min |
| Comp. Example C3 | Carbonate | Comp. Ex. C1 | 2-3 min | 4-5 min | 4 min |
| Comp. Example C4 | Silicate | * | 3 min | 6 min | 7-8 min |
| Comp. Example C5 | Silicate | Comp. Ex. C1 | 3 min | 6 min | 7-8 min |
| Example 4 | Carbonate | Ex. 1 | 7 min | 8-9 min | 9-10 min |
| Example 5 | Carbonate | Ex. 3 | 7-8 min | 7-8 min | 7-8 min |
| Example 6 | Silicate | Ex. 2 | 4-5 min | 9 min | 16 min |
| Example 7 | Silicate | Ex. 3 | 3-4 min | 7 min | 10-11 min |

*Monosol ™ M8630 modified polyvinyl hydroxide film available from MonoSol LLC.

The ability of a given polymer incorporated into a free standing film composition to subsequently inhibit scale formation when the free standing film is dissolved in water is displayed in this set of tests via transmittance measurements, wherein the onset of turbidity indicates the maximum tolerance level for the polymer towards the carbonate or silicate ions in solution. Therefore, the longer the time taken for transmittance to drop to low levels (e.g., T=40%) indicates a higher performance in terms of scale inhibition.

We claim:

1. A free standing dispersant film, comprising:
   19 to 85 wt % of a partially hydrolyzed polyvinyl acetate;
   5 to 70 wt % of a poly(ethylene oxide), wherein the poly(ethylene oxide) has a weight average molecular weight of 20,000 to 2,000,000 Daltons;
   1 to 35 wt % of a polyalkylene glycol, wherein the polyalkylene glycol has a weight average molecular weight of 250 to 5,300 Daltons;
   0.5 to 25 wt % of a plasticizer, wherein the plasticizer is selected from the group consisting of 1,2-ethanediol; 1,3-propanediol; 1,2-propanediol; 1,2,3-propanetriol; 1,4-butanediol; 1,5-pentanediol; 1,6-hexanediol; 2,3-butanediol; 1,3-butanediol; 2-methyl-1,3-propanediol; diethylene glycol; triethylene glycol; and mixtures thereof;
   2 to 50 wt % of a dispersant polymer, wherein the dispersant polymer is an amphoteric dispersant polymer; wherein the amphoteric dispersant polymer consists of a copolymer of an anionic vinyl monomer and a cationic vinyl monomer; wherein the anionic monomer is selected from at least one of acrylic acid and methacrylic acid; wherein the cationic vinyl monomer is selected from at least one of 2-(dimethylamino)ethyl methacrylate, 2-(diethylamino)ethyl methacrylate and 2-(dipropylamino)ethyl methacrylate;
   1 to 7.5 wt % of a poly(isobutylene-co-maleic anhydride) copolymer, wherein the poly(isobutylene-co-maleic anhydride) copolymer is at least partially neutralized; and
   0 to 10 wt % of an optional additive.

2. The free standing dispersant film of claim 1, further comprises:
   0.01 to 1.8 wt % of a polyvinyl pyrrolidone;
   wherein the weight ratio of the partially hydrolyzed polyvinyl acetate to the polyvinyl pyrrolidone is >10:1.

3. The free standing dispersant film of claim 2, wherein the free standing dispersant film includes at least one optional additive selected from the group consisting of a nano clay, a defoamer, a crosslinking agent and mixtures thereof.

4. The free standing dispersant film of claim 3, wherein the free standing dispersant film contains:
   0.05 to 0.2 wt % of the polyvinyl pyrrolidone;
   wherein the at least one optional additive includes a nano clay and a defoamer; and wherein the free standing dispersant film contains:
   0.1 to 0.5 wt % of the nano clay; and
   3 to 7 wt % of the defoamer.

5. The free standing dispersant film of claim 1, wherein the free standing dispersant film is cold water soluble.

6. The free standing dispersant film of claim 1, wherein the free standing dispersant film forms a cavity.

7. The free standing dispersant film of claim 6, wherein the cavity is encapsulated by the free standing dispersant film.

8. A unit dose package, comprising:
   a free standing dispersant film of claim 1; and
   a detergent formulation, comprising:
      14 to 60 wt % of a surfactant;
      3 to 25 wt % of a salt; and
      20 to 75 wt % of a water;
   wherein the free standing dispersant film forms a cavity; wherein the detergent formulation is disposed within the cavity; and wherein the detergent formulation is in contact with the free standing dispersant film.

9. The unit dose package of claim 8, wherein the free standing dispersant film encapsulates the cavity.

* * * * *